3,268,801
APPARATUS HAVING A PAIR OF SPACED ELECTRODES FOR MEASURING SPONTANEOUS POTENTIALS IN A WELL BORE WHILE DRILLING
Roy J. Clements, Houston, and Roland B. Stelzer, Bellaire, Tex., assignors to Texaco Inc., New York, N.Y., a corporation of Delaware
Filed Apr. 30, 1963, Ser. No. 276,901
2 Claims. (Cl. 324—10)

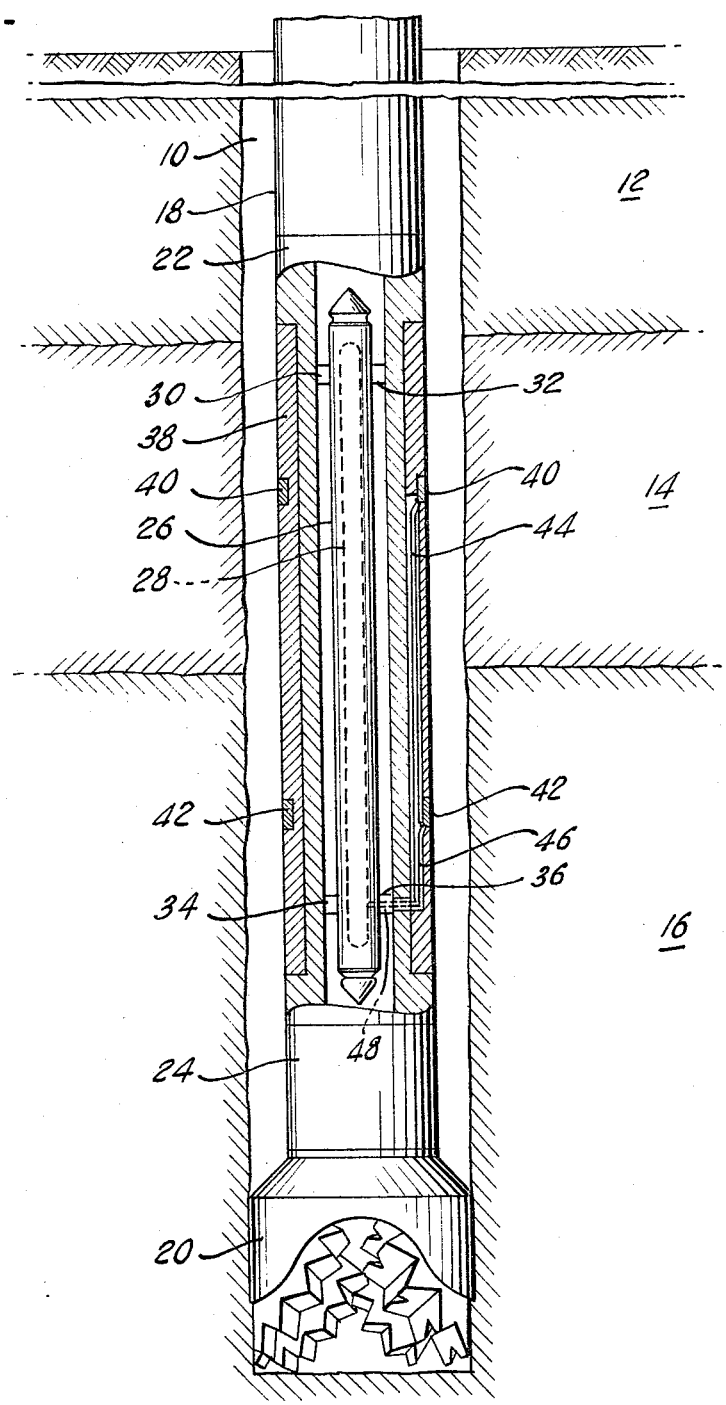

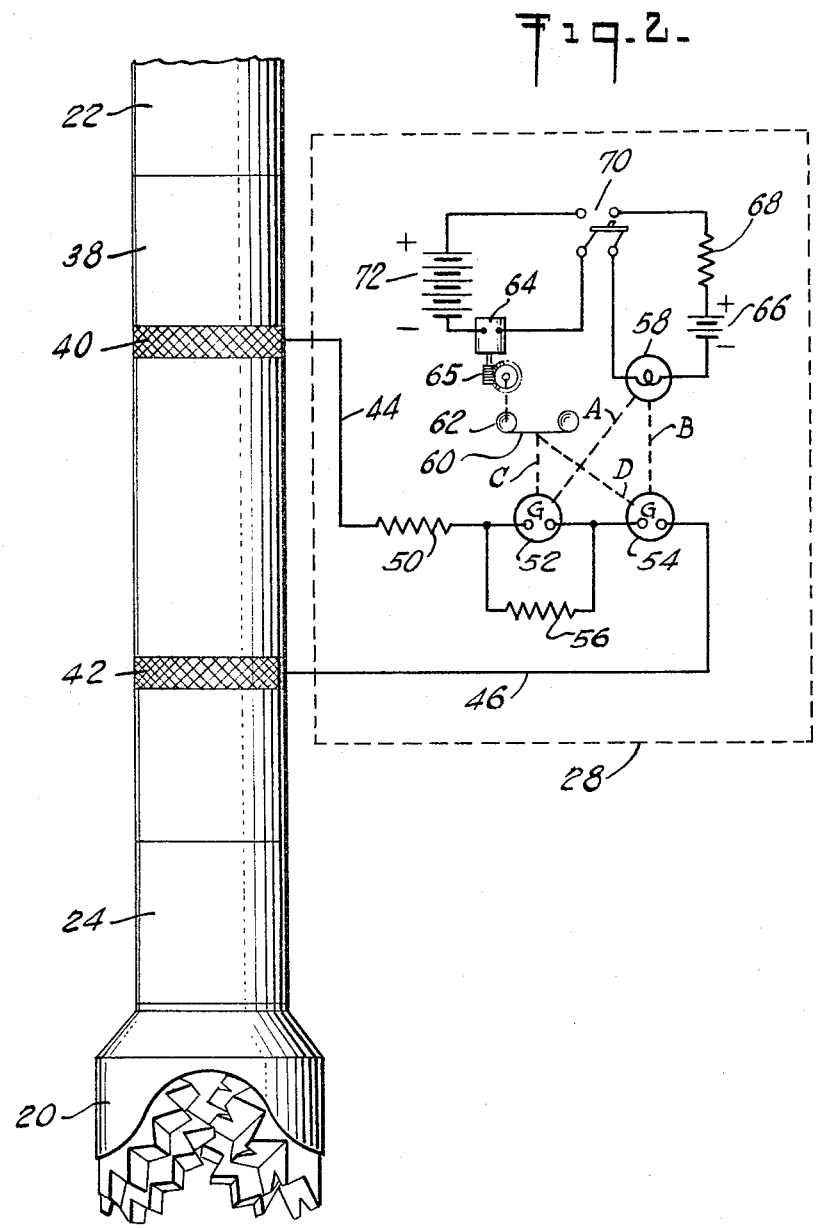

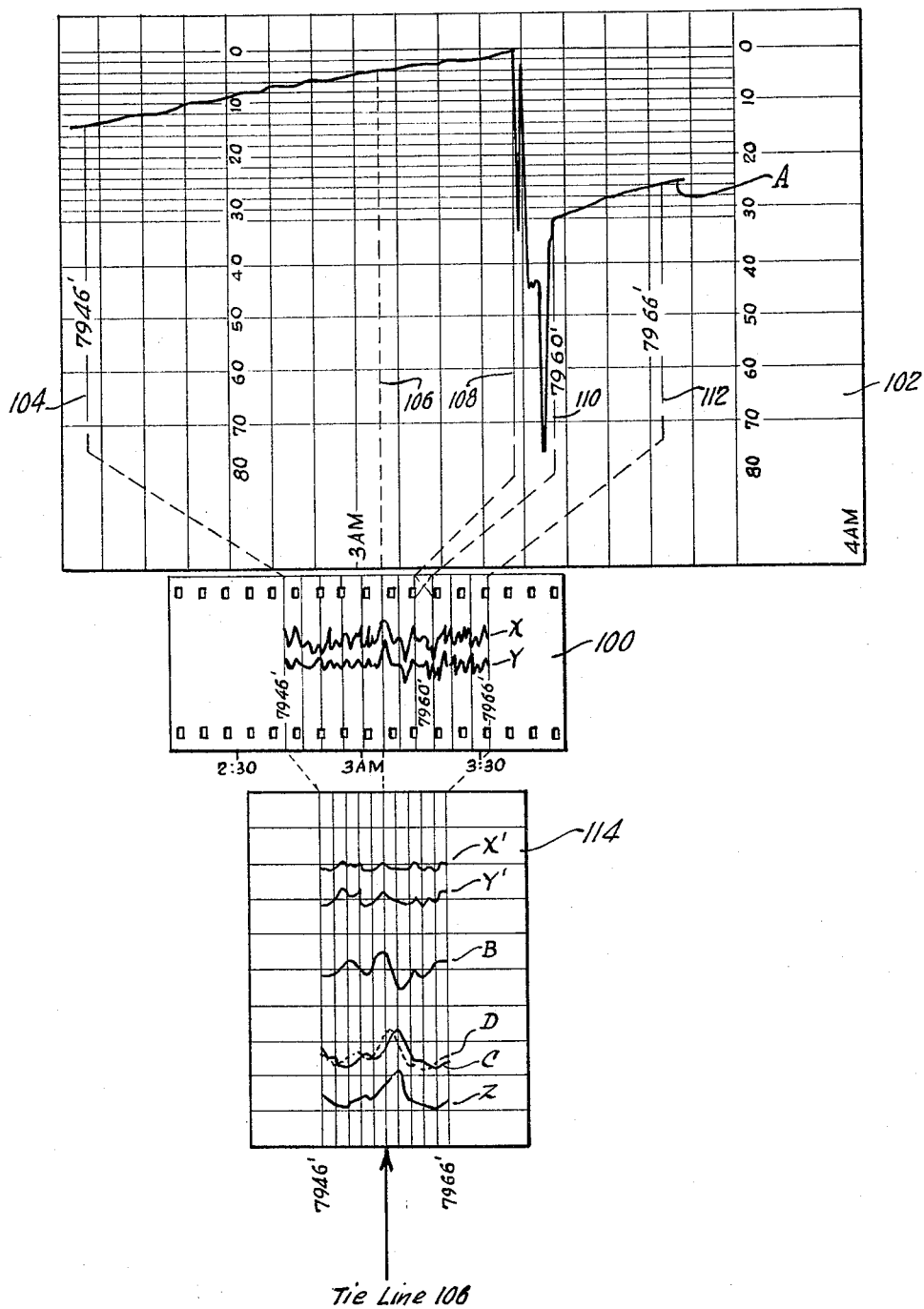

This invention relates to a method and apparatus for geophysical prospecting and, more particularly, to a method and apparatus for determining spontaneous potentials in a well bore as a parameter for characterizing earth formations traversed by the well bore.

More specifically, the invention concerns a method and apparatus for conducting a differential spontaneous potential log while the well bore is in the process of being drilled.

The conventional method of running a spontaneous potential log, also referred to hereinafter as an S.P. log, as widely practiced by the industry is well known. Briefly, the conventional method consists of lowering an electrode or sonde suspended by an insulated conductor cable into a well bore with the drill pipe removed and measuring changes in naturally occurring or spontaneous electrical potentials between this electrode as it traverses the well bore and a reference electrode driven into the ground at the surface of the earth a short distance from the well site. Thus, in this method measurements are made over a distance equal to the depth of the sonde in the well bore at the instant of measurement.

In recent years considerable progress has been made in the art of logging while drilling wherein logging instrumentation is contained in a drill collar in close proximity to the drill bit. One such method and apparatus is described in copending application Serial No. 677,969, now Patent No. 3,149,683, filed on August 13, 1959, in the names of Roy J. Clements, Burton D. Lee and Roland B. Stelzer. Although the logging while drilling method has been developed quite successfully for making electrical resistivity and radioactivity logs, it has not heretofore been possible to obtain a satisfactory spontaneous potential log with the type of apparatus normally used for this purpose, primarily due to the short circuiting effect of the uninsulated drill pipe extending throughout the length of the well bore.

Until now, attempts to obtain an S.P. log while drilling have been based on either the use of a surface electrode as a reference point or the use of the exposed length of drill pipe itself for this purpose. For example, one method employs a drill bit insulated from the main drilling string as one electrode which is connected by means of an insulated conductor located on the drill string to a sensitive voltage measuring device at the surface and thence to a reference electrode embedded in the ground near the well head. From a practical standpoint the use of a conductor cable inside the drill string is a serious disadvantage in that it drastically interferes with the facility with which stands of drill pipe may be added to or removed from the drill string. The necessity for insulating the drill bit from the drill string is also a disadvantage as will be further brought out hereinafter.

In another method of the prior art, the drill bit is insulated from the main drill stem and serves as the down-hole electrode. The main portion of the drill stem is used as the reference electrode instead of a surface electrode. In this method the drill bit is separated from the main portion of the drill stem by means of an insulated drill collar which contains measuring and transmission instrumentation.

Thus, these systems of the prior art are primarily designed to employ a reference electrode which maintains a substantially constant reference potential either in the form a remote electrode at the surface, or the main portion of the drill stem itself which because of its great length is not substantially affected by local potential changes.

A major practical disadvantage of the foregoing logging methods which employ an insulated drill bit or an insulated section of drill string results from the necessity for constructing the insulating device of a material of lower strength than the steel used for the remainder of the drill string. The insulating portion therefore constitutes a weaker section with all the hazards associated with possible breakage.

The present invention is directed to a well bore logging system which provides information concerning the spontaneous or natural electrical potentials existing in a well bore while drilling operations are in progress and at the same time obviates the disadvantages of the systems of the prior art. This is accomplished by continuously making differential spontaneous potential measurements, hereinafter referred to as differential S.P., while drilling is being conducted. As used herein the term "differential S.P." is intended to mean measurements made between two electrodes spaced relatively close together, of the order of a few feet, and wherein the potential on each electrode is influenced by a relatively short section of earth formations immediately adjacent. By comparison, in the systems of the prior art only one of the electrodes is affected by changes in the naturally occurring potentials at any specific location in a well bore whereas the other or reference electrode is maintained at a substantially constant potential.

Accordingly, a system is provided for logging spontaneous or natural potentials in a well bore with relatively close electrode spacings wherein a drill collar or similar tubular member forming part of a drill string and located in proximity to the drill bit is provided with a sheath of insulating material over a portion of its length. Two external electrodes encircling the drill collar and insulated therefrom by the insulating material are in contact with the well bore fluid and serve to detect naturally occurring electrical potentials present in the well bore due to characteristic differences in the adjacent earth formations. The two electrodes are electrically connected to logging instrumentation contained within the drill collar whereby potential differences between the two external electrodes are measured and either recorded or transmitted to the surface for recording in accordance with known methods. An important feature of the invention is the relative positions of the external electrodes with respect to the overall length of the insulated portion of the drill collar and to each other. Although some leeway is possible, the preferred geometrical arrangement is such that one electrode is located a distance from each end of the insulated portion equal to about 25% of the total length of the insulated portion and, thus the spacing between the two electrodes is about 50% of the total length of the insulated portion.

Accordingly, it is an object of this invention to provide a system for making measurements of differential spontaneous or naturally occurring potentials in a well bore.

It is a further object of this invention to provide a system for obtaining a differential S.P. log of a well bore while drilling is in progress.

Other objects and a fuller understanding of the invention may be had by referring to the following description and claims, taken in conjunction with the accompanying drawings in which like parts are designated by like reference numerals and in which:

FIG. 1 illustrates a side elevational view, partly in cross section, of a well bore containing a rotary drilling system including a preferred form of geophysical prospecting apparatus in accordance with the present invention mounted in the vicinity of the drill bit;

FIG. 2 illustrates a side elevational view of the instrument portion of a drill string constructed in accordance with the present invention together with a schematic circuit diagram of associated measuring and recording instrumentation; and FIG. 3 is a portion of a drilling record and a corresponding logging while drilling spontaneous potential original logging record on photographic film obtained with the method and apparatus of the invention. Also shown are corresponding differential S.P. traces adjusted by correlation with the drilling record and a conventional S.P. log over the same well bore section for comparison purposes.

Referring to the drawings in more detail, there is shown in FIG. 1 a well bore 10 traversing a plurality of earth formations 12, 14 and 16 containing the lower portion of a drill string or stem 18, including a drill bit 20, a tubular housing or pipe 22, and a sub 24 connecting the drill bit 20 to the housing 22. A sealed container or capsule 26 containing measuring and recording instrumentation 28 is disposed coaxially within housing 22 and is rigidly secured in spaced relation thereto by bosses or studs 30, 32, 34 and 36. A substantial length of the outer portion of housing 22 is covered by a layer of insulating material 38. A highly satisfactory insulating material for this purpose may be constructed from silicon carbide filled epoxy resin and glass cloth as described in U.S. Patent 3,072,843 which issued on January 8, 1963, in the names of Roy J. Clements and Roland B. Stelzer. Electrodes 40 and 42, which may be of the usual type of construction, such as a metallic conductor, are embedded in insulation material 38 and completely encircle housing 22. While lead is ordinarily used for such electrodes and is quite satisfactory for the purposes of the present invention, in order to minimize the development of unwanted potentials due to galvanic action resulting from the presence of dissimilar metals it is preferable that the metal used to form these electrodes be the same as the drill string, namely, steel in most instances. Also embedded in insulation 38 are lead-in wires 44 and 46 passing through feed-thru port 48 in stud 36 and connecting electrodes 40 and 42 respectively to measuring and recording instrumentation 38 in capsule 26.

Measuring and recording instrumentation 28 contained in capsule 26 is shown in FIG. 1 as being connected to electrodes 40 and 42 by means of lead-in wires 44 and 46 respectively. As shown in FIG. 2, electrode 40 is connected by means of lead-in wire 44, through 75 ohm resistor 50 to galvanometers 52 and 54, connected in series, and by means of lead-in wire 46 to the other electrode 42. In order to reduce the sensitivity of one galvanometer with respect to the other and thus provide for recording two potential measurements, one of high and the other of low sensitivity, galvanometer 52 is shunted by 15 ohm damping resistor 56. Galvanometers 52 and 54 should have minimum mass and maximum permissible stiffness for maximum resistance to shock and vibration. Midwestern Geophysical Laboratory Model 102–500 with special balance performs satisfactorily. This instrument is of the coil-mirror type with a focal length of three inches and a natural period of 500 cycles per second. It has a deflection of 0.008 inch per g of lateral acceleration at a 12-inch optical arm.

The mirrors of galvanometers 52 and 54 are illuminated by a 2½ volt surgical lamp 58 as shown in the drawing by dotted lines A and B. Light is reflected from the galvanometer mirrors along dotted lines C and D to moving photographic film 60 carried by transport mechanism 62 driven by motor 64 by means of worm and pinion gear 65. Eastman Kodak type LD135, 35 mm. drift survey film has a suitable temperature range and sensitivity. When lamp 58 is operated with a 1.2 volt source of potential correct film exposure is obtained. This potential is supplied by a 1.35 volt mercury cell battery 66, such as a Mallory RM42R cell, through 1.2 ohm voltage dropping resistor 68. The lamp circuit is completed through one side of double pole, single throw switch 70 which is closed when the logging apparatus is assembled at the surface for conducting a logging run. Film transport drive motor 64 is connected to battery 72 consisting of twelve 1.35 volt mercury cells connected in series, and to the other half of switch 70 so that the film transport is activated by throwing switch 70 when assembling the tool for operation.

In accordance with one embodiment of the invention, the film transport mechanism or, if desired, the electrical and electronic circuits located in the drill collar may be activated by a function associated with the commencement of drilling. For example, switch 70, or its equivalent, may be caused to close upon onset of centrifugal force, an increase in mud pressure, an increase in temperature associated with bottom hole environment, by a time delay mechanism anticipated to coincide with the start of drilling, or by any other physical phenomenon associated with subsurface placement of the equipment or motion thereof.

FIG. 3 shows a portion of a differential spontaneous potential log of a well in the Gulf Coast area obtained with the method and apparatus of the present invention while the well was being drilled. A conventional spontaneous potential log obtained on the same portion of the same well by a commercial logging company is shown for comparison. In this figure, trace X is a record of the deflection of sensitive galvanometer 54 and trace Y a record of shunted or damped galvanometer 52. Both of these differential spontaneous potential traces give similar responses but the excursions of trace X are of greater magnitude than those of trace Y. Trace Z is the corresponding conventional S.P. log in the same portion of the well.

FIGURE 3 also shows a record of the movement of the travelling block in the derrick during drilling of the same portion of the well. This drilling record or rig runner record, as it is commonly called, is utilized in interpretation of the logging while drilling data as will be explained hereinafter.

As mentioned above, actual downhole logging measurements recorded on photographic film 100 are shown by traces X and Y, trace X being a record of the deflection of sensitive galvanometer 54 and trace Y a record of the deflection of shunted or damped galvanometer 52. In the rig runner or drilling record 102, obtained during the drilling operation, trace A represents the position of the travelling block in the derrick as a function of hourly time. Dotted tie-lines 104, 106, 108, 110 and 112 connect points of common hourly time on the downhole logging record 100 and the rig runner record 102. By correlation of these two records with respect to time, well log 114 is constructed wherein traces X' and Y' corresponding to original traces X and Y, respectively, are a continuous plot of the differential spontaneous potential measurements against bore hole depth for a particular portion of the hole being logged.

In this figure, tie-line 106 is shown crossing traces X, Y and Z. For the purpose of clarity in reading the record, the zero levels of traces X and Y are separated. However, it is apparent that trace X recorded by the sensitive galvanometer 54 has a greater amplitude than trace Y. It is further evident that both the X and Y traces of the logging while drilling differential spontaneous potential measurements display peak values at the tie-line 106 intercept. Where tie-line 106 crosses the conventional spontaneous log (trace Z) a point intermediate a relative maximum and relative minimum excursion of the trace is recorded. More particularly, the intersection of tie-line 106 and trace Z defines a point of maximum slope on the conventional spontaneous potential curve. The depth at which this point is recorded is of great value to those skilled in the art of log interpretation. It is readily apparent that this event and its depth are clearly and unambiguously exhibited on the differential spontaneous potential log (traces X' and Y').

In further explanation of the method of obtaining final log 114, during the logging operation film transport drive motor 64 moves photographic film 60 such that light reflected from the mirrors of galvanometers 52 and 53 along dotted lines C and D of FIGURE 2 provides traces X and Y of the type shown in FIGURE 3. The film is driven at a known predetermined constant speed and with a precise knowledge of the starting time. Therefore, traces X and Y constitute a continuous recording of differential spontaneous potential measured in the bore hole while drilling as a function of hourly time. Simultaneously, drilling record 102 is prepared at the surface which shows the position of the travelling block with respect to hourly time. A device for making such a record is commercially available and is often referred to as a rig runner. As the travelling block moves upward and downward during the course of adding a length of drill pipe to the drill string and subsequently during the drilling of additional hole corresponding to the length of drill pipe added, a record shown as trace A in FIGURE 3 is obtained with the rig runner. The depth of the midpoint between the two differential spontaneous potential measuring electrodes 40 and 42 of FIGURE 1 is obtained by tallying the number of drill pipe sections or fractions thereof recorded on the drilling or rig runner record beginning at a known datum such as the depth from the driller's log at the time the bit is returned to the bottom of the hole and drilling is initiated, making appropriate adjustments of course to account for the linear distance between the midpoint between the measuring electrodes and the bottom of the bit. Thus, trace A can be marked off to be a record of electrode-depth versus time and used in conjunction with traces X and Y which are recordings of differential spontaneous potential versus time. It is evident from traces X and Y that certain intervals of the hole are logged more than one time. Specifically, a typical interval of depth is logged while drilling at a given rate and thence relogged relatively quickly during the process of adding a new joint of pipe to the drilling string. Measurements obtained only while drilling is progressing are desired and that portion of the record obtained relatively quickly while adding a new joint of pipe is in general removed from the finished record. An interval which is a rapid duplication of the desired log can be readily identified from trace A and is normally removed from the traces X and Y in preparing processed traces X' and Y'. A cross plot is then made between trace A and traces X and Y to eliminate time as a parameter. As a result, traces X' and Y' are true variations in the differential spontaneous potential with bore hole depth.

Further in FIGURE 3, trace Z is a conventional spontaneous potential log of the same portion of the same bore hole which provided traces X and Y. In order to show the relationship between the processed differential S.P. traces X' and Y' and the conventional S.P. log trace Z, either of two procedures may be used. Trace X' or Y' can be integrated with respect to logging depth to show a correlation with trace Z, or trace Z may be differentiated with respect to logging depth to show its correlation with trace X' or Y'. The second of these methods was employed to obtain the correlation shown in FIGURE 3. In this method, trace C is transcribed identically with trace Z but translated nine inches toward increasing depth along the depth scale. Similarly, trace D is identical with trace Z but translated exactly nine inches upward according to the logging depth scale, the depth differential of 18 inches between traces C and D being chosen to be identical to the longitudinal displacement between electrodes 40 and 42. In general, the relative translation along the depth scale for the intermediate step in the graphical differentation in FIGURE 3 should be equal to the spacing between electrodes used in logging the differential spontaneous potential while drilling. The step of graphical differentiation is effected by plotting the transverse difference between traces C and D for each value of log depth to produce trace B. It is apparent that trace B is plotted about an artificial zero line and that positive or negative excursions from this zero line are defined by the relative positions of traces C and D at each depth. As is appreciated by those skilled in the art, the choice of positive or negative excursions in making this plot has its counterpart in the presentation of traces X' and Y' and thereby is related to the relative electrical polarity at electrodes 40 and 42 in association with galvanometer connections and camera design.

Thus, it is evident that traces X and Y obtained while drilling can be processed in connection with surface recorded trace A to yield a processed differential spontaneous potential log versus bore hole depth as shown by traces X' and Y'. Furthermore, traces X' and Y' bear a relationship to the conventional spontaneous potential log as shown by trace Z. As is evident to those skilled in the art, the rate of change of the conventional spontaneous potential log is important in log interpretation and particularly in delineating subsurface formation boundaries. These significant rate of change events are clearly accentuated in the differential spontaneous potential log. Moreover, it will be appreciated that the measurements obtained while drilling represent more nearly subsurface conditions prior to the invasion of mud filtrate into the formation due to the relatively long period of time associated between the penetration by the bit and the running of a conventional log.

The conventional S.P. log is employed in oil well drilling operations to detect permeable beds, to locate their boundaries and to correlate the same formations in two or more wells. Basically, the S.P. log is a record of naturally occurring potential differences between a surface electrode and an electrode in a mud-filled well bore as it is moved past the earth formations traversed by the well bore. These downhole potential variations are caused by ohmic differences of potential in the column of mud in the well bore due to electrical currents flowing around the intersection of a permeable bed, the adjacent shales and the mud column. The electromotive forces causing the currents to flow are of electrochemical origin and occur at the contacts between the drilling mud, or its filtrate, and the formation water in the pores of permeable beds, and across adjacent shales.

As stated above, in conventional S.P. logging systems the generated potentials are measured with respect to a constant potential electrode buried in the ground at the surface of the earth. In the differential S.P. log of the present invention, potentials are measured between two electrodes spaced relatively close together as compared with the spacing for a conventional S.P. log. Preferably, the spacing between electrodes should be greater than the thickest formation to be logged to obtain good definition of formation boundaries. Obviously the electrode spacing is limited by the length of the insulating coating on the instrument housing or drill collar. Since the standard length of a drill collar or section of drill pipe is thirty feet, it is practically desirable to limit the apparatus and insulation to the length of one section or thirty feet.

The distance from each electrode to the closest portion of uninsulated drill pipe should be equal to at least one-half the direct distance between the electrodes in order to minimize short circuiting of the electrical current.

For most satisfactory results it is preferable that the insulated path between the two electrodes be approximately equal in both directions, that is, the direct distance between the electrodes should be approximately equal to the sum of the distances from each electrode to the end of the insulation at their respective ends. In addition, the distance of each electrode from its respective end of the insulated portion should be about equal. Stated another way, if the total insulated length is 100%, preferably one electrode should be about 25% of the total distance from one end, the other electrode should be about 25% of the total distance from the other end, and the distance between the two electrodes should be about 50% of the total insulated length. For a total insulated length of 28 feet, leaving one foot uninsulated at each end of a standard length of drill collar, an electrode should be about seven feet from each end of the insulated portion and the distance between them should be about fourteen feet.

This may be considered as being a maximum practical spacing when using one length of drill collar or drill pipe. If desired, two or more lengths of insulated drill collar or pipe may be coupled together and the electrode spacing increased proportionately. We have found, however, that informative logs may be obtained with even shorter spacings. For example, the differential spontaneous potential log shown in FIG. 3 was obtained when using a drill collar adapted to the present invention and having an insulated coating 84 inches in length and an electrode spacing of only 18 inches, one electrode being mounted in the middle of the insulated portion and the other electrode was mounted 18 inches below the middle.

It can be readily seen that with electrode spacings of such relatively short distance, neither electrode will remain at a constant reference potential with respect to the other as the logging apparatus traverses the various earth formations being drilled and a log obtained with the apparatus of the present invention will not duplicate a conventional S.P. log. Thus, although our log is based on the measurement of variations in spontaneous or naturally occurring potentials in a well bore, we obtain different readings and actually have a different log from the conventional S.P. log, as has previously been pointed out hereinbefore.

For a better understanding of the invention, a description of a suitable tool and its operation under typical logging conditions is presented. A modified drill collar may be made from a length of 4140 steel tubing, 5½ inches inside diameter, 8 inches outside diameter, by 10 feet 8 inches long. A ⅜ inch undercut should be made over a 7 foot interval on the outer circumference to allow for the application of an external flush coating of insulation. Preferably, the modified drill collar should be designed to support a weight of about 50,000 pounds with a safety factor of at least 3.7 and provided with a 6⅝ inch full hole tool joint on each end. Two subs also may be constructed as adapters from the API full hole thread to the regular 6⅝ inch API tool joint thread to permit insertion of the modified drill collar in a conventional drill string. The exterior of the modified drill collar should be provided with a coating of insulation containing two electrodes. The insulation coating, which fills the ⅜ inch deep undercut in the outer surface of the collar may be fabricated by means of a wet lay-up process wherein a reinforcing material or carrier such as glass cloth or fiber is wrapped and bonded with a resin mixture which includes approximately 100 parts by weight epoxy resin, 25 parts curing agent such as metaphenylene diamine, and 125 parts Carborundum filler. In accordance with the method set forth in our copending application Serial No. 677,994, now Patent No. 3,072,843, issued January 8, 1963, filed August 13, 1957, two electrodes are embedded in the epoxy mixture at the appropriate locations. The electrodes are made of multiple layers of 16 mesh copper window screen wire two inches in width to provide a finished electrode surface having a two inch width of exposed screen surface with a thickness of 5/16 inch to provide for wear. However, steel screening or lead might be used instead of the copper screening. For a seven-foot length of insulated surface, each electrode is spaced 21 inches from its center line to one end of the insulated portion. This results in a spacing of 42 inches between the center lines of the two electrodes.

A four-inch outside diameter cylindrical steel capsule is mounted concentrically inside the modified drill collar and held rigidly in place by means of studs welded to the capsule and to the drill collar. The logging instrumentation is assembled and shock mounted in a stainless steel inner case three inches in outside diameter by 6 feet 5½ inches long. This stainless steel inner case equipped with end plates having supporting shafts is mounted in the cylindrical steel capsule with thrust bearings in the top and bottom caps of the capsule to provide rotatability and angular shock isolation for the steel inner case. In such a typical tool the cylindrical steel capsule may have a wall thickness of ⅜ inch, a length of eight feet and should be designed to withstand a pressure of about 14,000 pounds per square inch.

As described in connection with FIG. 2, the logging instrumentation includes two galvanometers, one of which is shunted to provide a lower sensitivity. Galvanometer mirror deflections provide measurements of spontaneous potential variations with logging depth for both large and small signal levels. A Welch Allen #9, 2½ volt surgical lamp is used for a light source for the galvanometers. A film transport and drive mechanism operated by a 27 volt D.C. governor controlled electric motor having a speed of 8000 r.p.m. is employed. The output shaft speed of the motor is reduced to about ½ r.p.m. by using a reduction gear with a ratio of 16,833 to 1. A further reduction of 25 to 1 provided in the camera drive mechanism resulted in a film transport speed of 1.7 inches per hour. For this slow film speed it has been found that with about 1.2 volts applied to the lamp, correct film exposure is obtained. Mallory type RM42R mercury batteries are used for operation of the film drive mechanism and the surgical lamp. The instrument is designed with sufficient battery capacity and film supply to operate continuously for 36 hours.

The galvanometers, film drive and transport mechanism and batteries are assembled in a rigid frame 2¾ inches in diameter by 6 feet 4 inches in length and the assembled instrumentation are shock mounted in the stainless steel inner case.

In employing the apparatus of the present invention insulated housing 22 containing logging instrumentation 28 and having electrodes 40 and 42 affixed thereto in accordance with FIGS. 1 and 2, is assembled and readied for the logging operation by inserting the batteries and film in sealed capsule 26. If apparatus is not provided for activating the film transport mechanism when the drill is on the bottom of the hole and drilling as set forth hereinbefore, the last operation before closing sealed capsule 26 is to throw switch 70 to activate the instrumentation, the exact time of throwing the switch being accurately observed and noted. Housing 22 is then assembled in a conventional drill string between the bit and a conventional collar, using sub 24 at the lower end as an adapter and, if necessary, an equivalent sub (not shown) at the upper end for connecting to drill string 18. The drill string is then lowered into the well bore being drilled until the bit reaches bottom and drilling ensues in the customary manner. At the same time measurements of potential differences between electrode 40 and electrode 42 are recorded on film 60. The potential difference between electrodes 40 and 42 is measured simultaneously by means of sensitive galvanometer 54 and shunted galvanometer 52. The deflection of the mirrors of the galvanometers is recorded by reflection of a beam of light from lamp 58 to film 60 which is moving at a fixed uniform rate of speed on film transport mechanism 62. Variations in natural potentials in the well bore cause the mirrors of galvanometers 52 and 54 to move proportionately, thus causing the position of the beam of light reflected on film 60 to move in a direction transverse to the movement of film 60. This transverse movement of the light beam produces an undulating wave form on the film when the film is developed, which wave form is a measure of naturally occurring or spontaneous potentials in the well bore between electrodes 40 and 42.

Ordinarily the drill bit is returned to the surface, either for replacement or for daily inspection about every 24 hours. At this time the film is removed from sealed capsule 26 and developed. The developed film constitutes a differential S.P. log with respect to time of the section of the well bore drilled while the logging instrumentation was in service. The log usually consists of two traces, as shown in FIG. 3, in which trace X is the more sensitive trace and shows large deflections for measured potentials. Trace Y is less sensitive and shows smaller deflections for the same measured potentials. As a result, if the measured potentials are relatively large the deflection of the mirror of the more sensitive galvanometer responsible for trace X may cause this trace to go off scale. At the same time, these maximum excursions are accurately recorded by less sensitive trace Y.

In actual field use it has been found that not only is there a definite correlation between the differential S.P. log and the character of earth formations adjacent the well bore, the differential S.P. log gives more detail than the conventional S.P. log and thus provides more information concerning the nature of the earth formations traversed by the logging apparatus. Generally this detail is evident from more frequent reversal of the measured voltage gradients in the well bore.

In the logging while drilling process the progress of the drill bit is very slow and it is not necessary that the instruments be in operation continuously. Actually, if measurements are recorded for an interval of time as short as ten seconds out of every minute, the log will appear substantially as though the instrument had been operating continuously. Thus, in logging while drilling this feature makes it possible to simultaneously obtain both a resistivity and an S.P. log by alternately recording each for a short interval of a few seconds out of each minute. Another advantage of this feature in logging while drilling is that through suitable instrumentation the unit may be activated for as little as ten seconds out of each minute, thus resulting in increased battery life by as much as six-fold.

Obviously, many modifications and variations of the invention as hereinbefore set forth may be made without departing from the spirit and scope thereof and therefore only such limitations should be imposed as are indicated in the appended claims.

We claim:
1. Apparatus for making a differential spontaneous potential log of a well bore penetrating earth formations while drilling operations are in progress comprising a rotatable drill string including a drill bit at the bottom end thereof and a tubular instrumentation member located above said drill bit, a sealed housing contained within said tubular member, instrumentation means disposed within said housing for measuring electrical potentials, a layer of insulating material surrounding said tubular member for a substantial portion of the length of said tubular member, and first and second electrodes affixed in spaced relationship in the outer circumference of said insulating material and insulated thereby from said tubular member and from each other, means connected to said first and said second electrodes for recording electrical potentials existing between said electrodes due to self-generating properties of said earth formations while drilling operations are in progress and means for correlating said recorded electrical potential as a function of the depth of said tubular member in said well bore, said first electrode being positioned a predetermined distance from one end of said insulating material, said second electrode being positioned a predetermined distance from the opposite end of said insulating material, the distance of said first electrode and said second electrode from the closest uninsulated portion of said tubular member being substantially equal to one-half of the distance between said first and said second electrodes, whereby said first and second electrodes are substantially electrically balanced with respect to said tubular member.

2. An apparatus for logging self-generated electrical potentials in earth formations along the traverse of a well bore while drilling operations are in progress and wherein said apparatus comprises a rotatable drill string, including a drill bit at the bottom end thereof and a tubular instrumentation member located above said drill bit and constructed of an electrically conductive material, a sealed housing contained within said tubular member, instrumentation means disposed within said housing for measuring electrical potentials, a layer of electrical insulating material surrounding said tubular member for a substantial portion of the length thereof, an electrode assembly including first and second electrodes affixed in longitudinally spaced relationship to one another along the outer circumference of said insulating material and isolated electrically thereby from said tubular member and from one another, means for electrically connecting said electrodes to said instrumentation means for measurement of spontaneous electrical potential differences between said electrodes, and means comprising substantially equal lengths of said insulating material separating said first and said second electrodes respectively from uninsulated adjacent portions of said tubular member for a distance substantially equal to half the distance between each of said electrodes, whereby said first and said second electrodes are substantially electrically balanced with reference to said tubular member.

References Cited by the Examiner
UNITED STATES PATENTS

| | | | |
|---|---|---|---|
| 2,755,432 | 7/1956 | Arps et al. | 324—10 X |
| 2,759,143 | 8/1956 | Arps | 324—10 X |
| 2,917,704 | 12/1959 | Arps | 324—10 X |
| 3,072,843 | 1/1963 | Clements et al. | 324—10 |

WALTER L. CARLSON, *Primary Examiner.*

G. R. STRECKER, *Assistant Examiner.*